No. 861,448. PATENTED JULY 30, 1907.
G. B. FELLOWS & W. W. WADE.
ICE CREAM FREEZER.
APPLICATION FILED MAR. 2, 1906.

3 SHEETS—SHEET 1.

Witnesses
G. R. Thomas
K. G. Whitcomb

Inventors
W. W. Wade
G. B. Fellows
By Swift &c.
Attorneys

No. 861,448. PATENTED JULY 30, 1907.
G. B. FELLOWS & W. W. WADE.
ICE CREAM FREEZER.
APPLICATION FILED MAR. 2, 1906.
3 SHEETS—SHEET 2.
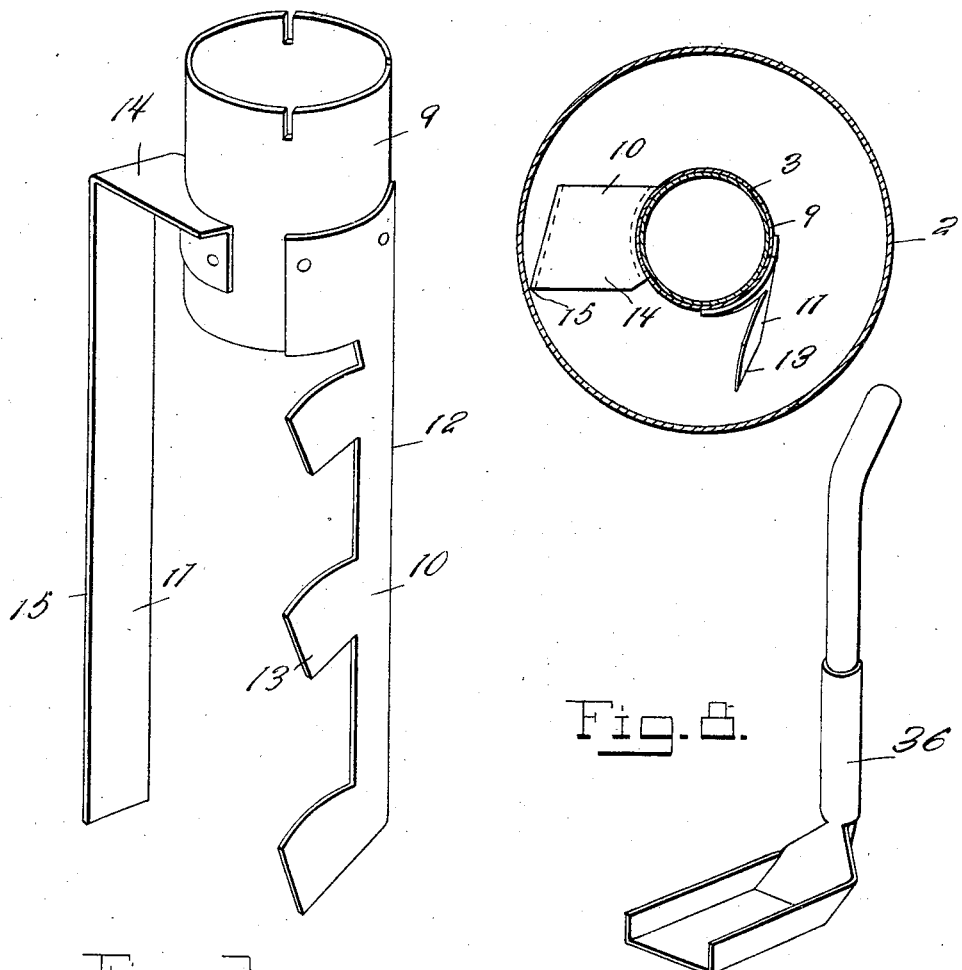

No. 861,448.

PATENTED JULY 30, 1907.

G. B. FELLOWS & W. W. WADE.
ICE CREAM FREEZER.
APPLICATION FILED MAR. 2, 1906.

3 SHEETS—SHEET 3.

Witnesses
G. R. Thomas
K. G. Whitcomb

Inventors
W. W. Wade
G. B. Fellows

By Swift &6.
Attorneys

UNITED STATES PATENT OFFICE.

GEORGE B. FELLOWS AND WALTER W. WADE, OF FAIRFAX, MISSOURI.

ICE-CREAM FREEZER.

No. 861,448.　　　　　Specification of Letters Patent.　　　Patented July 30, 1907.

Application filed March 2, 1906. Serial No. 303,881.

*To all whom it may concern:*

Be it known that we, GEORGE B. FELLOWS and WALTER W. WADE, citizens of the United States, residing at Fairfax, in the county of Atchison and State of Missouri, have invented a new and useful Ice-Cream Freezer; and we do hereby declare the following to be a full, clear, and exact description of the invention, such as will enable others skilled in the art to which it appertains to make and use the same.

The invention relates to ice cream freezers, and has for its object to provide a simple, durable, and inexpensive device of this character, which is adapted to freeze the cream in a very short period, and at a small expenditure of power.

Our invention consists of a central and outer ice chamber, the central or inner one, having a complete drainage, and means for preventing the ice from rotating therein.

A further object of the invention is to provide means by which the ice fed to the central chamber is prevented from entering the cream receptacle, and means for enabling ice to be fed to said central receptacle without removing any of the parts.

Other and further objects of the invention will appear from the following description and claims appended thereto.

Figure 1:
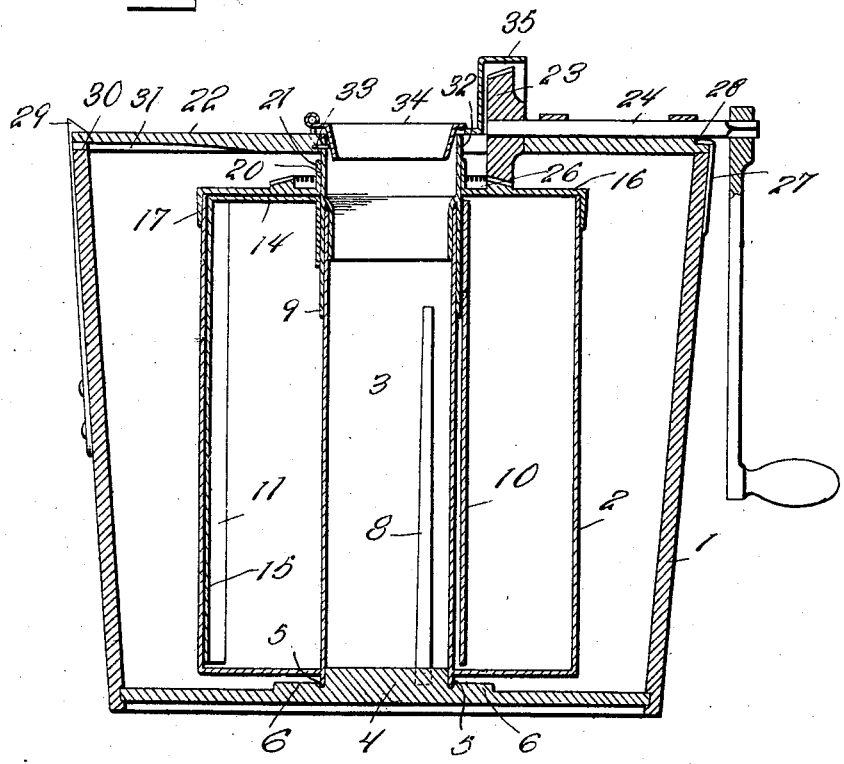
Figure 2:
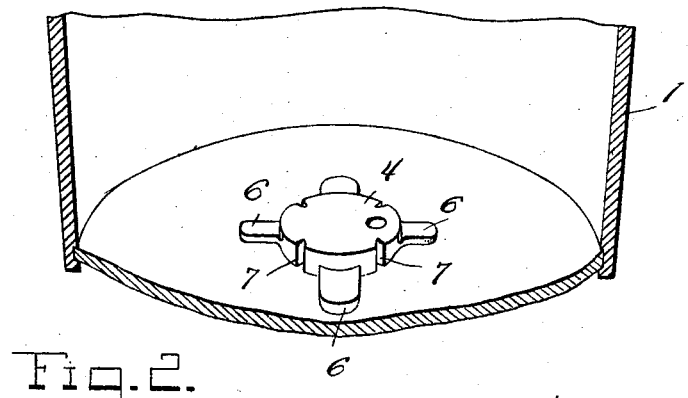
Figure 5:
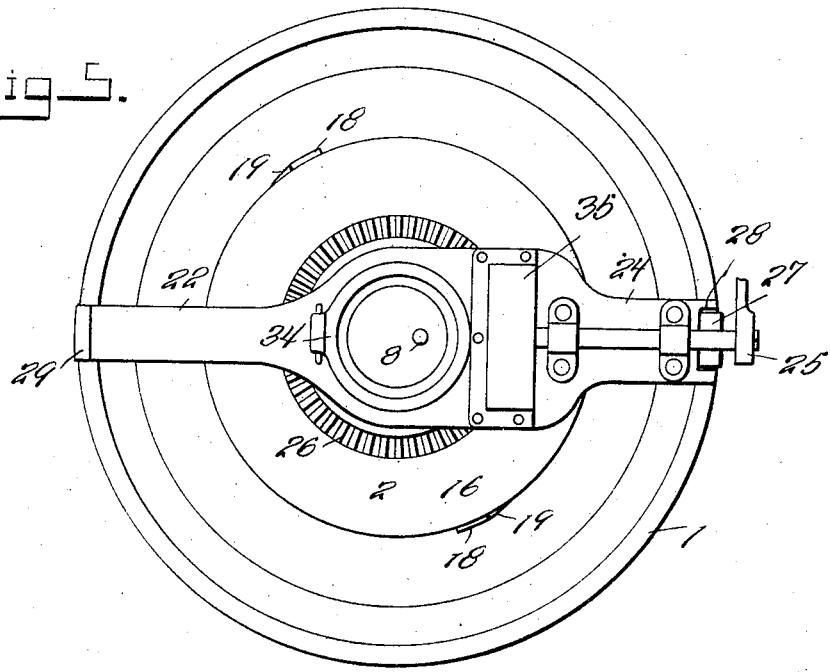
Figure 6:
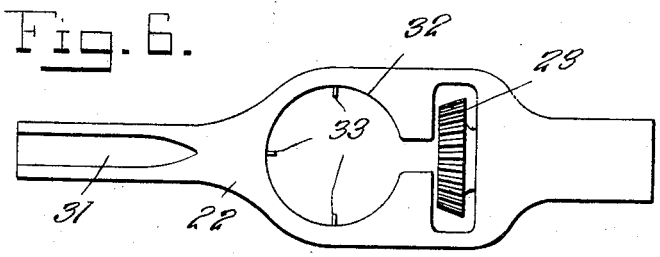
Figure 7:
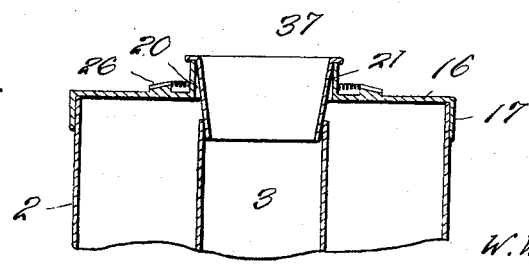

In the drawing, forming part of this specification and in which like numerals of reference designate corresponding parts, Figure 1 is a vertical sectional view, of an ice cream freezer constructed in accordance with this invention. Fig. 2, is a sectional perspective view, showing the boss and the projection in the bottom of the tub. Fig. 3 is a perspective view of the dasher. Fig. 4 is a horizontal section through the cream receptacle, with the dasher mounted therein. Fig. 5 is a top plan view of the device. Fig. 6 is a bottom plan view of the cross head. Fig. 7 is a vertical section of the top of the cream receptacle, with the dasher removed and the supplemental ring fitted to the receptacle. Fig. 8 is a perspective view of the scoop.

Referring more particularly to the drawings, 1 indicates an ice tub and 2 the cream receptacle having a central ice chamber 3 open at both ends. The cream receptacle is rotatably mounted in the ice tub by means of a central boss 4 on the bottom of the tub and a depending annular flange 5 on the bottom of the receptacle, the flange 5 closely fitting about the boss and being held above the bottom of the tub by extensions 6. Between the extensions the boss is provided with grooves 7 which permit water in the central ice chamber of the receptacle to drain off. To prevent the ice within the central ice chamber rotating with the cream receptacle an eccentrically positioned projection 8 extends upwardly in the chamber from the boss 4.

The dasher is held against rotation by a means to be hereinafter more particularly described, and comprises a sleeve 9 closely surrounding the upper end of the wall of the central ice chamber, and a pair of spring dasher blades 10 and 11.

The sleeve 9 carries on its inner face, a downwardly turned flange which engages over the top edge of the central ice chamber 3 and prevents the entrance of the ice to the cream receptacle 2. The dasher blade 10 is secured at its upper end to the sleeve 9 and has an edge 12 which scrapes the wall of the cream receptacle that forms the ice chamber and a plurality of rearwardly deflected tongues 13. The dasher blade 11 extends horizontally from the sleeve 9 to form an edge 14 to scrape the top to be hereinafter described and also extends vertically, being provided with an edge 15 to scrape the inner face of the outer wall of the cream receptacle.

The top 16 of the cream receptacle has a depending flange 17 to surround the outer wall of said receptacle, the receptacles being provided with fins 18 and the flange being provided with lugs 19 to coöperate with the fins and cause the receptacle to be rotated with the top. The center of the top is provided with an opening 20 through which the sleeve 9 projects and to make a tight fit the top is provided with an upwardly extending flange 21.

To rotate the cream receptacle a cross piece 22 is supported on the upper edges of the tub 1 and carries a bevel gear 23 journaled on a shaft 24 which is rotated by a crank 25 the bevel gear meshing with an annular rack 26 surrounding the flange 21 on the top of the cream receptacle. The cross piece is secured to the tub at one end by hooks 27 on the tub engaging in a seat 28 on the cross piece and at the other end by a beveled spring snap hook or latch 29 which engages the upper face of the cross piece, a projection 30 on the tub engaging in a recess or notch 31 on the cross piece to prevent lateral movement under the hook 29.

To hold the dasher against rotation and at the same time permit the central ice chamber 3 to be filled, the cross piece is provided with an annular opening 32, the walls of which are provided at diametric points with projections 33 adapted to enter slots in the sleeve 9 of the dasher. The cross piece has pivoted at 33 a tapering or funnel shaped ring 34 which fits within the sleeve 9 and prevents the entrance of the ice between said sleeve and the flange 21. A shield 35 covers the bevel wheel 23 and acts as a guard to prevent injury to the hand during the filling of the central ice chamber.

36 indicates a shovel or scoop for the removal of the cream.

After freezing, the operating mechanism and the dasher are removed and the supplemental ring 37 is fitted as shown as in Fig. 7.

It will be seen that I have provided an ice cream freezer in which the cream receptacle has its cooling walls of maximum area, the inside and outer walls and the bottom and top walls serving the purpose, thereby making it possible to make ice cream in a greatly reduced time. It is inexpensive to manufacture and simple in operation. Further, it makes smooth ice cream with but little more ice than those without the central ice chamber.

Having thus described my invention, what I claim and desire to secure by Letters Patent is

1. The combination of a tub having a central boss provided with drain grooves, a cream receptacle provided with a central ice chamber open at both ends and a depending flange on its bottom, fitting the central boss; and means for rotating the cream receptacle.

2. The combination of a tub having a central boss, extensions from the boss, said boss being provided with drain grooves between the extensions; a cream receptacle provided with a central ice chamber open at both ends and a depending flange on its bottom fitting the central boss and resting in the extensions, and means for rotating the said receptacle.

3. The combination with the rotatable cream receptacle having a central ice chamber of a cross piece having an opening located over the central ice chamber, a sleeve fitting about the wall forming the central ice chamber and secured to the walls of the opening in the cross piece, and dasher blades carried by the sleeve, and a funnel shaped ring pivoted to the cross piece to cover the upper edge of the sleeve.

4. The combination with the rotatable cream receptacle having a central ice chamber, of a cross piece having an opening located over the central ice chamber, a sleeve fitting about the wall forming the central ice chamber and secured to the walls of the opening in the cross piece, and dasher blades carried by the sleeve, and a downwardly turned flange carried by the inner face of the sleeve and covering the top edge of the wall forming the central ice chamber.

5. The combination with a rotatable cream receptacle having a central ice chamber, of a cross piece having an opening located over the central ice chamber and provided with projections on the walls of the openings, a sleeve fitting about the wall forming the central ice chamber, and provided with slots in which the projections fit and dasher blades carried by the sleeve.

In testimony whereof we have hereto affixed our signatures, in the presence of two witnesses.

GEORGE B. FELLOWS.
WALTER W. WADE.

Witnesses:
N. F. DRAGOO,
U. C. SENFT.